Figures 1, 2:
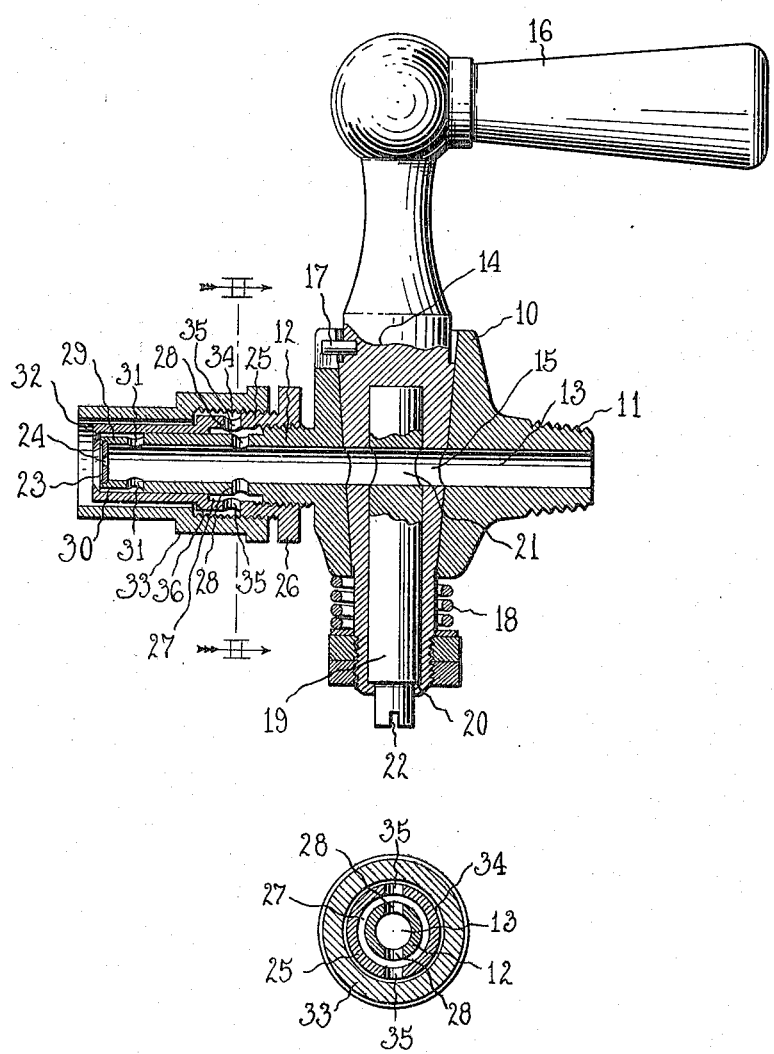

A. W. BICE.
GAS REGULATING VALVE.
APPLICATION FILED JAN. 12, 1916.

1,221,660.

Patented Apr. 3, 1917.

Witnesses
Arthur F. Draper
Chas W. Stauffiger

Inventor
Arthur W. Bice
By
Attorneys

UNITED STATES PATENT OFFICE.

ARTHUR W. BICE, OF WINDSOR, ONTARIO, CANADA.

GAS-REGULATING VALVE.

1,221,660.      Specification of Letters Patent.      Patented Apr. 3, 1917.

Application filed January 12, 1916. Serial No. 72,083.

*To all whom it may concern:*

Be it known that I, ARTHUR W. BICE, a subject of the King of England, residing at Windsor, in the county of Essex and Province of Ontario, Canada, have invented certain new and useful Improvements in Gas-Regulating Valves, of which the following is a specification, reference being had therein to the accompanying drawings.

This invention relates to an improved gas regulating valve and more particularly to a valve of the type shown in Patent No. 1065913, dated July 1, 1913, wherein the volume and velocity of the gas are regulated by a single sleeve upon the discharge nipple of the valve.

Through experiments carried out by me I have found that it is difficult to properly regulate both the velocity and volume of the gas under all conditions varying from a very low supply pressure to a very high supply pressure, and it is the main object of this invention to provide simple means whereby the velocity of the gas and its volume may be separately regulated to give perfect combustion under all pressure conditions.

A further object is to provide a simple construction which may be easily adjusted to prevent any back flash and eliminate the noise incident to the discharge of the gas from the nipple under pressure. It is also an object of the invention to provide certain other new and useful features in the construction and arrangement of parts, and to these ends the invention consists in the matters hereinafter set forth and more particularly pointed out in the appended claims, reference being had to the accompanying drawing, in which—

Figure 1 is a longitudinal vertical section through a valve embodying features of the invention, and Fig. 2 is a cross section thereof substantially on the line II—II of Fig. 1.

The regulating valve comprises a casing or body 10 having a laterally extending screw threaded nipple or branch 11 to engage a screwthreaded opening in a suitable supply pipe (not shown) and formed integral with the body diametrically opposite the branch 11, is a discharge nipple 12 which is formed tubular by boring the branch and nipple longitudinally and transversely through the body to form a gas supply passage 13. The body is formed with a vertical tapering bore intersecting the passage 13, and forming a seat for a plug valve 14 which is tapered in the usual manner to fit the seat or tapered bore of the body. This plug is provided with a transverse bore 15 corresponding to the passage 13 and adapted to open and close said passage when the plug is turned by means of a handle 16 upon its upper end. The turning movement of the plug is limited in the usual manner by means of a pin 17 engaging a slot in the body. Said plug is held to its seat in the body by the usual coiled spring 18 sleeved upon its projecting lower end between the lower end of the body and suitable nuts on the screwthreaded lower end of the plug.

The plug is also bored longitudinally from its lower end inward, with the bore intersecting the transverse passage 15, and in this bore is fitted a pin 19 having a reduced outer end forming a shoulder 20 over which the metal of the lower end of the plug is turned inwardly to hold the pin firmly in place in the bore. The pin is provided with a transverse hole 21 corresponding in diameter with the gas passage 13, and the transverse bore 15 of the plug, so that by turning the pin 19 by means of a tool inserted in a slot 22 in the outer end of the pin, the hole 21 in the pin may be turned partially or wholly out of alinement with the main gas passage to regulate the volume of gas passing through said passage.

The discharge end of the nipple 12 is closed by a head 23 secured in its open end and provided with a very small axial jet opening 24 with its largest end opening inwardly so that there will be less frictional resistance to the passage of the gas through the jet opening and its velocity will be considerably increased by its tapering form.

The nipple 12 is provided with screw threads near the body of the valve to engage an interiorly screwthreaded sleeve 25 which may be adjusted thereon by means of a flange 26 on the end of the sleeve and beyond the screw threads, the nipple is reduced in diameter throughout an intermediate portion of its length, and near its outer end is further reduced in diameter. For approximately one-half of its length, the interior diameter of the sleeve 25 is the same as the diameter of the screwthreaded portion of the nipple, thus forming an annular chamber 27 between the sleeve and nipple which chamber communicates with the main gas passage 13 through ports 28 in the nipple. The outer half of the sleeve 25 is bored to fit the intermediate portion of the nipple which is of greater diameter than the end portion 29 of the nipple, and thus a second chamber 30 is formed between the reduced end portion of the nipple and the sleeve. This chamber communicates with the gas passage 13 through ports 31 in the nipple. At the extreme outer end of the sleeve 25 is an inwardly extending annular flange 32, the inner side of which flange is beveled outwardly to form an inclined surface which will engage the right angle shoulder of the nipple when the sleeve is run back upon the nipple to the limit of its movement. When its sleeve is so adjusted that its flange 32 engages the end of the nipple, the chamber 30 is closed and no gas will pass from the main passage through said chamber, but when said sleeve is adjusted to bring the flange at a distance from the end of the nipple, gas will pass through the ports 31 into the chamber 30, out through the annular opening between the flange and the end of the nipple where it will join the jet from the center jet opening and be carried through the Bunsen tube in the usual manner to the burner (said tube and burner not being shown in the drawing).

The sleeve 25 is screwthreaded externally near the flange 26 to receive a second sleeve which is internally screwthreaded. The inner sleeve is reduced in diameter externally for a distance from its screw thread to form a chamber 34 between said sleeve and the external sleeve 33. The chamber 34 communicates with the chamber 27 through ports 35. The inner sleeve is further reduced in diameter from its outer end for approximately one-half its length, thus forming a shoulder 36 to oppose a like internal shoulder on the external sleeve formed by reducing the internal diameter of the external sleeve from intermediate its ends to its outer end. The internal diameter of this reduced outer end portion of the outer sleeve is however greater than the external diameter of the outer reduced end portion of the inner sleeve so that there is a narrow annular space between the two sleeves extending from the shoulders outwardly. Therefore when the outer sleeve is adjusted upon the inner sleeve as shown in Fig. 1 with its shoulder a short distance from the shoulder 36 of the inner sleeve, gas may pass through the ports 28 and 35 into the annular chamber 34 and from said chamber pass the opposed shoulders and out through the annular space between the sleeves to the end of the inner sleeve, which end is formed at right angles to the outer surface of said sleeve to provide a sharp right angle shoulder around which the gas will turn toward the center jet and be carried thereby to the burner.

With both sleeves adjusted so that no gas can escape through the chambers 30 and 34, the only discharge will be through the center jet opening 24 and as the full pressure and volume is behind this opening, gas will escape therethrough with high velocity. This adjustment of the parts will be used only when the pressure of gas is very low in the supply passage and the velocity of the escaping jet will be greatly increased by the tapered formation of the jet opening and also the thin wall or disk in which it is formed, the thinness of the disk offering very little frictional surface to retard the flow. While with this adjustment a higher velocity of the jet is secured with a very low pressure in the supply pipe, yet it will often be found that a sufficient volume of gas will not escape through the jet opening to maintain perfect combustion and prevent the blowing off of the flame, and in that case an auxiliary supply of gas may be furnished to the jet without materially reducing its velocity, by adjusting the inner sleeve upon the nipple to permit gas to escape through the ports 31 into the chamber 30 and from said chamber past the flange 32. Owing to the slant or incline of the inner side of the flange 32, gas will flow around through the chamber 30 and issue into the jet at the end of the nipple with considerable velocity, without materially affecting the velocity of the jet. A low pressure may therefore give the necessary velocity, and the necessary volume of gas to maintain perfect combustion is supplied by the adjustment of the inner sleeve.

When, however, there is a high pressure of gas in the supply pipe, this pressure may be reduced by allowing a portion of the gas to escape laterally from the main supply passage before it reaches the end of the discharge nipple. Such escape is provided through the ports 28 into the chamber 27 and through the ports 35 into the chamber 34, from which latter chamber it escapes past the shoulder 36 and outward through the annular passage between the inner and outer sleeves. The gas from the chamber 34 in passing the shoulder 36 and outwardly through the annular passage, is retarded by friction, and robbed of its velocity. When it issues from the end of the passage at the end of the sleeve, it unites with the gas issuing through the jet opening, decreasing the velocity of the jet by loading it with a volume of inert gas.

When the volume of gas passing through the main gas passage is too great, it may be cut down by turning the pin 19 in the valve plug so that when the valve is fully opened, the passage will be restricted sufficiently to lessen the volume the desired amount. By adjusting the sleeves relatively to each other and the inner sleeve upon the nipple, any desired velocity and volume according to the pressure in the main supply passage, may be secured. The valve is therefore adapted for any pressure from the minimum to the maximum and also for any volume of flow, and by proper adjustment of the sleeve, perfect combustion will be secured at the burner under all conditions, thus effecting a saving of fuel and preventing any back flash, noise of issuing gas, or disagreeable odors.

What I claim is:—

1. The combination of a nipple having a jet opening in the end thereof and a plurality of separately adjustable members each providing a separate lateral gas passage from the nipple to supply gas around the jet issuing from the jet opening, certain of said members being formed to restrict the flow at a distance from the discharge end of its passage and another to restrict the flow adjacent the discharge end of its passage.

2. The combination of a nipple having a jet opening in the end thereof, an inner sleeve adjustable upon the nipple and providing an annular gas passage around the end of the nipple communicating with the interior of the nipple, and an outer sleeve upon the inner sleeve forming an annular gas passage between the sleeves communicating with the interior of the nipple, said sleeves being separately adjustable to open and close said passages and formed, the one to restrict the flow at a distance from the discharge end of the passage and the other to restrict the flow adjacent to the discharge end of its passage.

3. The combination of a nipple having a jet opening in the end thereof, a sleeve adjustable longitudinally upon the nipple into and out of engagement with the end thereof, said sleeve providing an annular gas passage around the end of the nipple communicating with the interior thereof and opened and closed by the adjustment of the sleeve into and out of engagement with the end of the nipple, and a second sleeve longitudinally adjustable upon said sleeve and forming an annular gas passage between said sleeves open at the end of said passage, said second sleeve being formed to restrict the flow of gas through said passage between the sleeves by an adjustment of said sleeve.

4. The combination of a tubular nipple having a jet opening at its discharge end, a sleeve adjustable upon said nipple and forming an annular gas passage around the nipple extending to the end thereof and communicating with the interior of the nipple, said sleeve being provided with an annular flange to engage the end of the nipple and close said passage when the sleeve is adjusted longitudinally, and an outer sleeve adjustable upon said sleeve and forming an annular gas passage between the sleeves open at the outer end thereof and communicating with the interior of the nipple at the inner end of said passage, said outer sleeve being formed intermediate the ends of said passage between the sleeves to open and close said passage by an adjustment of said outer sleeve.

5. The combination of a tubular nipple having a jet opening at the discharge end, a sleeve longitudinally adjustable upon said nipple and forming an annular gas passage around the nipple extending to the end of the nipple and communicating with the interior of the nipple near said discharge end, said sleeve being provided with an inwardly extending flange having an outwardly inclined inner side to engage the end of the nipple and close said passage, and an outer sleeve upon said first sleeve forming an annular gas passage between the sleeves open at the discharge end of the sleeves and communicating with the interior of the nipple at the inner end of said passage, said sleeves being formed with opposed annular shoulders intermediate the ends of the passage between said sleeves adapted to be brought into engagement with each other by a relative adjustment of said sleeves to close said gas passage and regulate the flow.

6. The combination of a nipple having a jet opening in the end thereof, a member formed to supply gas under pressure to the stream issuing from the jet opening, and a separate member forming a restricted passage to supply a volume of gas of low velocity to the stream.

7. The combination of a nipple having a jet opening in the end thereof, a member formed to supply gas under pressure to the stream issuing from the jet opening, and a separate member forming a passage to supply a volume of gas to the stream, said passage being formed to retard the flow and supply gas of low velocity, said members being separately adjustable to separately regulate the volume and velocity of the stream of gas discharged.

8. The combination of a nipple having a jet opening in the end thereof, means forming a passage to supply gas under pressure to the stream issuing from the jet opening, and means forming a passage to rob gas passing therethrough of velocity and for supplying said gas of low velocity to said stream.

In testimony whereof I affix my signature in presence of two witnesses.

ARTHUR W. BICE.

Witnesses:
LEWIS E. FLANDERS,
ANNA M. DORR.